United States Patent [19]

Horowicz

[11] Patent Number: 4,527,260

[45] Date of Patent: Jul. 2, 1985

[54] METHOD FOR SEISMIC EXPLORATION BY VERTICAL SEISMIC PROFILING AND INSTALLATION FOR ITS IMPLEMENTATION

[75] Inventor: Leon Horowicz, Sceaux, France

[73] Assignee: Schlumberger Technology Corporation, New York, N.Y.

[21] Appl. No.: 320,799

[22] Filed: Nov. 12, 1981

[30] Foreign Application Priority Data

Oct. 9, 1981 [FR] France .................. 81 40156

[51] Int. Cl.³ .............................. G01V 1/28
[52] U.S. Cl. ........................ 367/27; 367/34; 367/43
[58] Field of Search .............. 367/25, 27, 33, 35, 367/36, 40, 49, 55, 57, 59, 63, 34, 43; 364/422, 421

[56] References Cited

U.S. PATENT DOCUMENTS

| | | | |
|---|---|---|---|
| 3,339,176 | 8/1967 | Sparks | 367/46 |
| 3,371,310 | 2/1968 | Silverman | 367/57 |
| 4,314,364 | 2/1982 | Bickel | 367/43 |
| 4,397,004 | 8/1983 | Bronislaw | 367/27 |

FOREIGN PATENT DOCUMENTS 1569582 6/1980 United Kingdom .

OTHER PUBLICATIONS

Balch et al., "The Use of Vertical Seismic Profiles in Seismic Investigations of the Earth", Tech Paper, Presented at the 33rd Annual Midwestern Meeting of S.E.G., Mar. 23-25, 1980, Tulsa.

*Primary Examiner*—Sal Cangialosi
*Assistant Examiner*—K. R. Kaiser
*Attorney, Agent, or Firm*—Stephen L. Borst; David G. Coker

[57] ABSTRACT

A seismic exploration method is disclosed for filtering the signals produced by a detector placed at different depths in a well in response to an emission of acoustic waves from a source on the surface: the signals comprising downgoing wave components and upgoing wave components.

The filtering consists in sampling from among the N signals to be processed a group of n signals $s_1 \ldots s_n$ detected at respective levels $x_1 \ldots x_n$, in determining the propagation time $t_k$ of the acoustic waves from the level $x_1$ to each level $x_k$, in both advancing and delaying the signals $s_k$ by the time $t_k$ in relation to $s_1$, in adjusting the signals for the effects of the acoustic impedance of the formation, in combining $s_1$ and the signals $s_k$ thus shifted and adjusted to obtain a sum $z_1'$, in calculating a sum $y_1'$ of $s_1$ and of the thus delayed and adjusted signals $s_k$, and in generating a signal $u_1^{*'}$, defined as an optimum estimation of the upgoing wave component, from the sums $y_1'$ and $z_1'$.

6 Claims, 12 Drawing Figures

METHOD FOR SEISMIC EXPLORATION BY VERTICAL SEISMIC PROFILING AND INSTALLATION FOR ITS IMPLEMENTATION

This invention relates to a method for the investigation of underground formations by the so-called vertical seismic profile technique in which a plurality of, or a single acoustic wave detector is placed in a well successively at different depths, acoustic waves are emitted by means of a source on the surface and the signals produced by the detector are recorded.

An essential object of these measurements is to reveal the reflecting horizons or "mirrors" located lower than the bottom of the well, by detecting and analyzing the upgoing acoustic waves reflected by these reflectors and that are rising toward the detector.

However, the detected waves include, in addition to the upgoing waves, a downgoing component which is propagated directly from the source to the detector and which has undergone multiple reflections and contains spurious waves of various kinds.

By grouping all the detected signals from all levels in a single display it is possible to note coherences between the different traces. However, due to the multiplicity of the components involved in each signal, interpretation of such a display is exceedingly difficult.

It thus appears necessary, in order to improve the signal-to-noise ratio and to better distinguish the upgoing waves, to filter the collected signals.

A known method for accentuating the upgoing wave components is to shift the signals so as to align the upgoing waves and to stack the signals thus shifted. This technique is based upon the fact that, for two given signals $s_i$ and $s_k$, the shift between the time of arrival of the upgoing waves is of the same value as the shift $t_k$ relative to the downgoing waves of opposite direction, provided the reflector does not have an excessive dip. And the shifts $t_k$, which represent the propagation time of the acoustic waves from one level to another, are very easily obtained, for example from an acoustic log of the well indicating the propagation velocity in the traversed formations. However, this stacking technique does not in itself provide a sufficient noise rejection.

Moreover, as concerns the detection levels, the conventional technique consists in choosing them at equal distances (see "Vertical Seismic Profiling" by E. E. Gal'perin, *Society of Exploration Geophysicists*, Special Publication No. 12, pp. 11–12.

French Pat. No. 2 432 177 provides for the processing of two signals corresponding to consecutive levels by shifting them to align the downgoing waves and by subtracting them from each other. Provided the shift $\Delta t$ has a given value, equal to one-fourth the pseudo-period of the acoustic waves, one obtains the suppression of the downgoing wave component and the strenthening of the upgoing wave component.

This however is in fact true only for the frequency corresponding to the above pseudo-period.

In addition, the assignment of a constant value to all the times $\Delta t$ is equivalent to pre-determining the detection levels, which in practice is a serious drawback for the following reason.

The quality of the collected signals is critically dependent on the quality of the acoustic coupling between the detector and the formation. The acoustic coupling is itself dependent on the condition of the well at the particular level.

Thus, if the measurement takes place in an open hole, the coupling between the detector and the formation will be good if the well diameter is regular and the formation compact.

In a cased hole, it is the bond between the casing and the formation provided by the cement which will be decisive.

It is thus important, in order to obtain optimum quality detection signals, to be able to choose freely the detection levels and hence to be able to depart from the rule set forth in the above-mentioned French patent.

From the same viewpoint, it is desirable to be able to eliminate the detection signals whose quality appears deficient. This possibility does not exist if the filtering method used is based upon the assumption that all the shifts between signals of consecutive levels are equal.

The invention thus aims to improve the signal-to-noise ratio of the detection signals in order to greatly accentuate the upgoing wave components, while allowing a free choice of the detection levels and the possible elimination of deficient quality signals.

According to the invention, the filtering of the detection signals includes the following operations:

sampling from among the N signals to be processed a group of n signals $s_1 \ldots s_k, \ldots s_n$ detected at successive levels $x_1 \ldots x_k \ldots x_n'$ determining the propagation times $t_k$ of the acoustic waves from the level $x_1$ to each level $x_k$;

shifting each signal $s_k$ by advancing it by the time $t_k$ in relation to the signal $s_1$ so as to align the downgoing wave components;

shifting each signal $s_k$ by delaying it by the time $t_k$ in relation to the signal $s_1$;

correcting each of said delayed signals and each of said advanced signals for the effects of the transmissivity of the respective portion of the formation traversed by each of said signals by the application of a transmissivity correction operator $A_k$ and its conjugate $\overline{A}_k$ respectively;

combining the signal $s_1$ and the signals $s_k$ thus advanced to obtain a stack $z_1'$;

combining the signal $s_1$ and the signals $s_k$ thus delayed to obtain a stack $y_1'$;

generating a signal $u_1^*$, defined as an optimum estimation of the upgoing wave component for all the signals $s_1 \ldots s_n$, from the signals $y_1'$ and $z_1'$;

recording this signal $u_1^*$;

and repeating these operations to obtain the signals $u_2^* \ldots u_i^* \ldots u_N^*{}_{-n+1}$.

The filtering method according to the invention does not place any condition on the times $t_k$ and consequently the detection levels $x_k$ can be chosen as a function of the condition of the well so as to obtain an optimum acoustic coupling between the detector and the formation.

For the same reason, nothing prevents the elimination of certain collected signals if their quality is found to be insufficient. This possibility contributes to improving the signal-to-noise ratio of the signals obtained.

Preferably the signals $z_1$ and $y_1$ are obtained by adding the signal $s_1$ and the signal $s_k$ respectively advanced and delayed, and the signal $u_1^*$ is defined as an optional estimation resulting from a least squares fit.

To determine the signals $u_i^*$, the invention envisages two different solutions.

The first consists in passing into the frequency domain. One obtains $u_i^*$ from its Fourier transform $U_i^*$, which is derived by a simple relation from the Fourier transforms $Y_i$ and $Z_i$, respectively, of $y_i$ and $z_i$. In the second solution, one works only within the time domain. One then obtains an approximate value $u_i^*$ directly from stacks $y_i$ and $z_i$. The approximate nature of the results is compensated by a high degree of processing simplicity.

Another advantageous feature of the method according to the invention is that it makes it possible to determine, just as simply, optimum estimations $d_i^*$ of the downgoing wave components. Knowing the values $d_i^*$ is necessary for the deconvolution processing which is applied in a conventional manner following the filtering. As regards deconvolution, reference will be made to the article by P. Kennett et al, "Vertical Seismic Profiles: Their Applications in Exploration Geophysics", *Geophysical Prospecting*, 1980, 28, pp. 684 and following.

The invention will be better understood through the following description given with reference to the appended drawings. In the drawings.

BRIEF DESCRIPTION OF THE DRAWINGS

Figure 1:
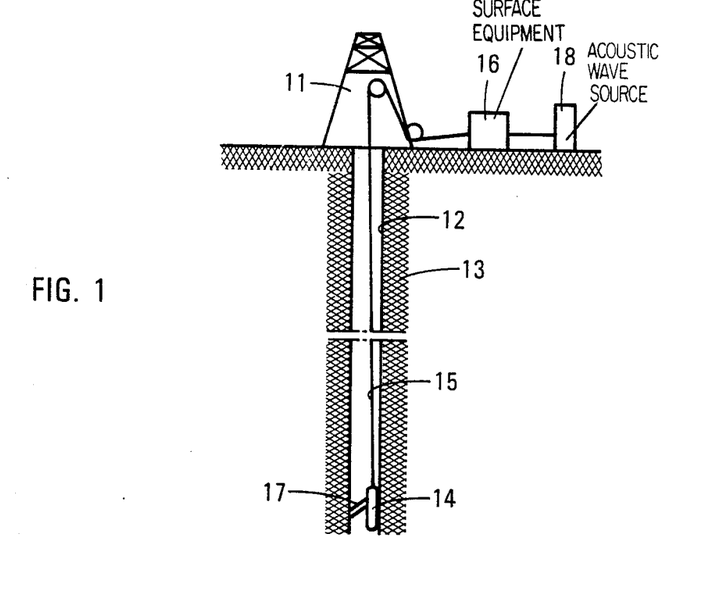
FIG. 1 represents schematically a seismic exploration arrangement for obtaining a vertical seismic profile (VSP)

FIG. 1 represents an arrangement for conducting seismic exploration which includes a drilling rig 11 placed over a well 12 bored in earth formations 13.

A downhole apparatus 14 comprising an acoustic wave transducer such as a geophone is suspended in the well 12 by means of an electric cable 15 running over pulleys attached to the drilling rig. The cable 15 makes it possible to move the apparatus 14 in the well and at the same time allows the transmission of the detection signals produced by the transducer toward a surface equipment 16. The surface equipment 16 comprises in a conventional manner a winch for winding the cable and means for determining the depth at which the downhole apparatus 14 is located, as well as means for processing and recording the detection signals transmitted via the cable 15.

The downhole apparatus 14 comprises, also in a conventional manner, a mobile anchoring element 17 which can move away from the apparatus 14 and anchor itself in the wall to provide suitable contact between the transducer and the well wall. When the apparatus 14 has reached a depth at which a measurement is to be carried out, the surface equipment 16 transmits a message to control the deployment of the anchoring element.

An acoustic wave source 18 is placed on the surface at a given distance from the well head. This source can be made up of any appropriate device such as an air gun. The source 18 is controlled from the surface equipment 16 for shooting when the downhole apparatus 14 is anchored at one of the chosen depth levels.

Several shots are carried out for each level, and all the signals thus produced are stored in memory and added in the surface equipment 16 so that for each level one obtains a signal in which the significant components are reinforced to the detriment of the random noise components. By convention, this signal will be referred to below as the detection signal.

Figure 5:
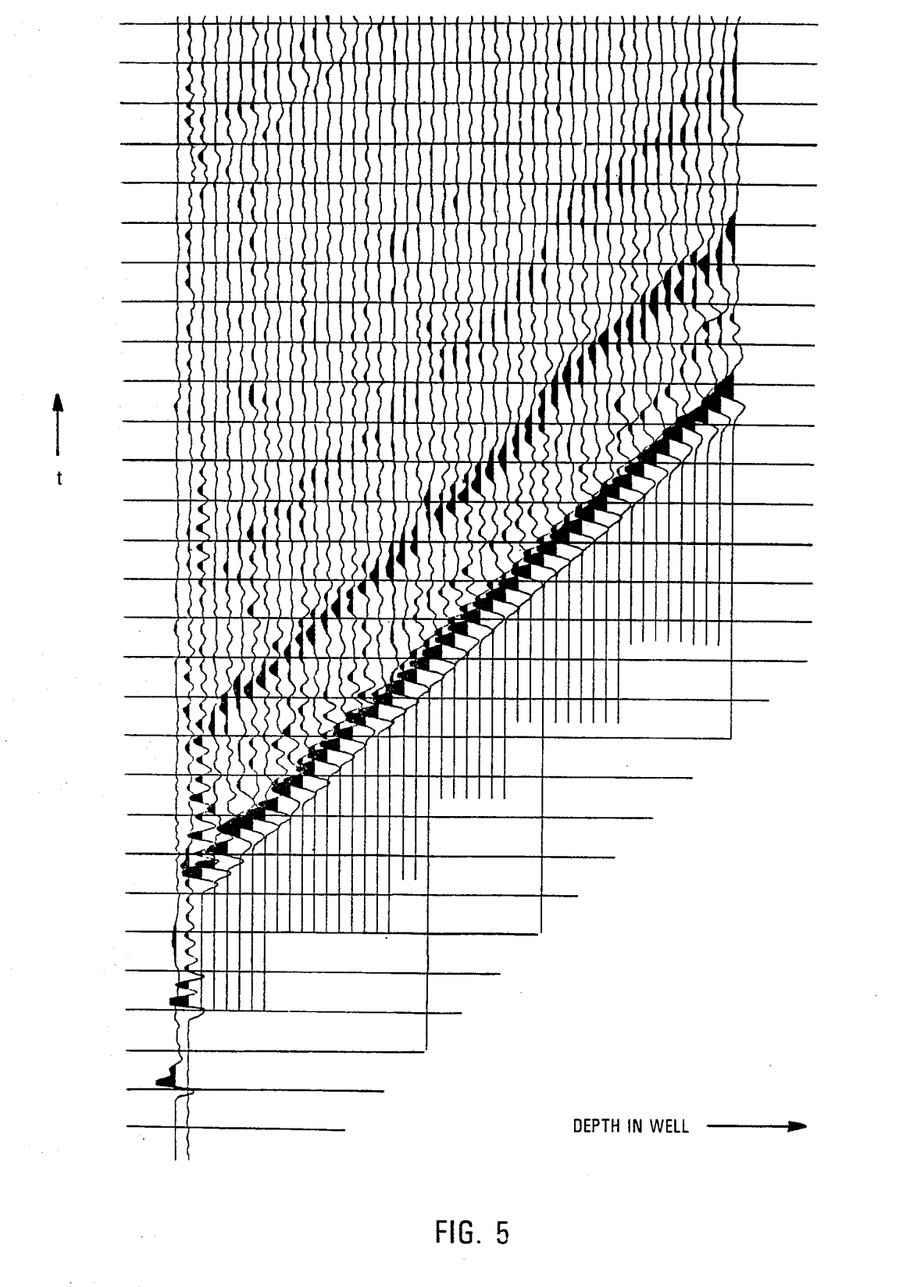
FIGS. 5 and 6 show, as an example, a vertical seismic profile before filtering by means of the system of FIG. 3.

From all the detection signals obtained for the different levels, graphic recordings or seismic traces are produced which are grouped in a single document or display called a vertical seismic profile (VSP), an example of which is shown in FIG. 5.

Figure 2:
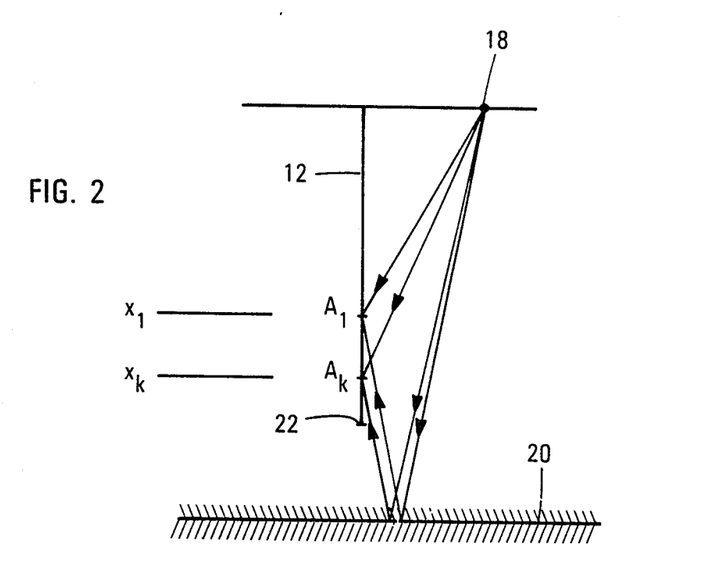
FIG. 2 shows in a very simplified manner the path of the downgoing and upgoing acoustic waves for two different positions of the detector.

FIG. 2 represents in a very simplified manner the path of the acoustic waves detected by the transducer at two levels. The reference 20 designates a reflecting horizon or "mirror" deeper than the well bottom 22. The reflector 20 may be formed by the interface between two layers with clearly different acoustic impedance.

The transducer placed at $A_1$ at the level $x_1$ receives an acoustic wave propagated directly from the source, called a downgoing wave, and a wave reflected by the reflector 20, called an upgoing wave. It is this upgoing wave which must be enhanced in order to be able to determine the depth of the reflector and its reflection coefficient.

The detection signal $s_1(t)$ obtained at the level $x_1$ is thus the sum of a downgoing wave component $d_1(t)$ and an upgoing wave component $u_1(t)$ and moreover includes noise components, some of which come from multiple reflections from the reflectors located between the surface and the bottom of the well.

The transducer placed at $A_k$ at the level $x_k$ will similarly receive a downgoing wave and an upgoing wave, but relative to signals received by a transducer positioned at $A_1$, the downgoing wave will arrive later and the upgoing wave sooner. The shift $t_k$ between the arrival times of the downgoing waves is equal to $$t_k = \frac{x_k - x_1}{v_k}$$

$v_k$ being the average propagation speed of the acoustic waves in the section delimited by the levels $x_1$ and $x_k$.

The shift $t_k'$ between the times of arrival of the upgoing waves is equal to $-t_k$ if the reflector 20 is substantially horizontal. A corrective term must be added if the reflector 20 exhibits a significant dip. We shall however assume during a first phase that it is not necessary to introduce such a correction.

In view of the preceding, the signal $s_k(t)$ obtained at the level $x_k$ includes a downgoing wave component $$d_k(t - t_k)$$

and an upgoing wave component $$u_k(t+t_k).$$

Figure 4:
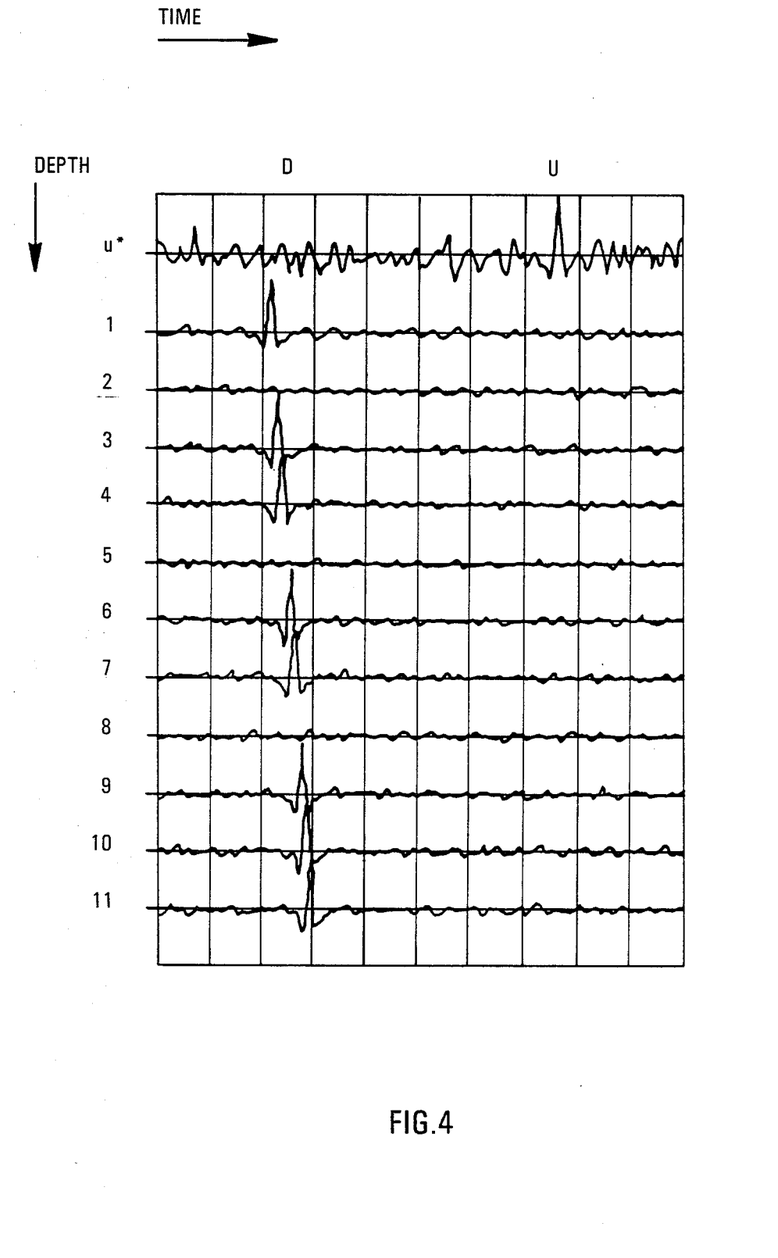
FIG. 4 illustrates the filtering effect provided by the system of FIG. 3.

In the diagrams of FIG. 4, prepared from synthetic data, as in the vertical seismic profile of FIG. 5, resulting from real measurements, peaks are observable corresponding to the downgoing waves and it can be verified that they are shifted regularly from one trace to another. On the other hand, in both cases, the upgoing wave components have too low a signal-to-noise ratio to allow their detection.

The filtering of the collected signal is thus necessary to distinguish the upgoing wave with sufficient clarity.

The filtering principle proposed is the following.

From among the N detection signals to be processed $s_1 \ldots s_N$, let us sample a series of n signals, for example $s_1 \ldots s_k \ldots s_n$ ($n \leq N$).

Let us state that there are estimations $u_1^*$ and $d_1^*$ of the upgoing wave and downgoing wave components which are optimum for all of the n signals above.

Considering the preceding, it is possible to write, according to the least squares formulation, that it is necessary to minimize the expression $$\sum_{k=1}^{n} s_k(t) - u_1^*(t+t_k) - d_1^*(t-t_k)^2 \quad (1)$$

In the frequency domain, the above expression (1) becomes $$\sum_{k=1}^{n} S_k - \alpha_k U_1^* - \overline{\alpha}_k D_1^{*2} \quad (2)$$

where $s_k$, $U_1$ and $D_1$ are the Fourier transforms of $s_k(t)$, $u_1^*(t)$ and $d_1^*(t)$, and $\overline{\alpha}_k$ and $\alpha_k$ are respectively the operators $\exp(-it_k w)$ and $\exp(it_k w)$. We of course have $t_1 = 0$ and $\alpha_1 = \overline{\alpha}_1 = 1$.

By cancelling the derivatives with respect to $U_1^*$ and $D_1^*$ of expression (2) we obtain the equations $$\sum_{k=1}^{n} \overline{\alpha}_k S_k - U_1^* \cdot \sum_{k=1}^{n} \alpha_k^2 - nD_1^* = 0 \quad (3)$$

$$\sum_{k=1}^{n} \alpha_k S_k - D_1^* \cdot \sum_{k=1}^{n} \alpha_k^2 - nU_1^* = 0 \quad (4)$$

From this, by solving the equations (3) and (4) at $U_1^*$ we get $$U_1^* = \frac{\sum_{k=1}^{n} \alpha_k \cdot S_k - \sum_{k=1}^{n} \alpha_k^2 \cdot \sum_{k=1}^{n} \overline{\alpha}_k \cdot S_k}{n^2 - \sum_{k=1}^{n} \alpha_k^2 \cdot \sum_{k=1}^{n} \overline{\alpha}_k^2} \quad (5)$$

$\overline{\alpha}_k S_k$ is the Fourier transform of the signal $s_k(t+t_k)$, obtained by advancing the signal $s_k(t)$ by the time $t_k$ in relation to the signal $s_1(t)$. By thus shifting $s_k$ in relation to $s_1$, the alignment of the downgoing wave components is obtained. The sum $$\sum_{k=1}^{n} \overline{\alpha}_k S_k$$

is thus the Fourier transform $Z_1$ of a signal $z_1(t)$ obtained by adding the signal $s_1(t)$ and the signals $s_k(t+t_k)$.

Similarly, $\alpha_k S_k$ is the Fourier transform of the signal $s_k(t-t_k)$ obtained by delaying $s_k(t)$ in relation to $s_1(t)$, this shifting producing the alignment of the upgoing wave components.

The sum $$\sum_{k=1}^{n} \alpha_k S_k$$

is thus the Fourier transform $Y_1$ of a signal $y_1(t)$ obtained by adding the signal $s_1(t)$ and the signals $s_k(t-t_k)$.

The expression then becomes $$U_1^* = \frac{nY_1 - Z_1 \cdot \sum_{k=1}^{n} \alpha_k^2}{n^2 - \sum_{k=1}^{n} \alpha_k^2 \cdot \sum_{k=1}^{n} \overline{\alpha}_k^2} \quad (6)$$

and from $U_1^*$, $u_1^*$ is calculated by inverse Fourier transformation.

The times $t_k$ can be determined by simple reading from an acoustic log of the well. However, a preferable calculation method consists in detecting the peaks corresponding to the first arrivals of the downgoing waves and in measuring the time between them.

The above method thus provides in a simple manner an optimum estimation of the upgoing wave components.

These operations are then repeated to determine a signal $u_2^*$ from the signals $s_2 \ldots s_{n+1}$, and so on until the group $s_{N-n+1} \ldots s_N$. Finally, from N signals to be processed, a series of $(N-n+1)$ signals $u_i^*$ is obtained.

$D_1^*$ is obtained in a corresponding manner by the expression $$D_1^* = \frac{nZ_1 - Y_1 \sum_{k=1}^{n} \alpha_k^2}{n^2 - \sum_{k=1}^{n} \alpha_k^2 \cdot \sum_{k=1}^{n} \overline{\alpha}_k^2} \quad (7)$$

and from this is obtained the inverse Fourier transform $d_1^*$, the optimum estimation of the downgoing wave components, and then successively all the signals $d_i^*$. The signals $d_i^*$ are necessary for implementing the deconvolution which is carried out in a conventional manner after filtering.

By aligning the recordings of the signals $u_i$ in the form of a VSP, it will be observed that the corresponding peaks are perfectly lined up and very clear if the reflector 20 is substantially horizontal.

If it is observed that the peaks are less clear and are shifted with respect to each other, it must be assumed that the reflector 20 exhibits a rather accentuated dip.

In this case, the deviations $\epsilon_k$ between the position of the peaks and the position they would occupy in the absence of dip are determined and the preceding operations are repeated replacing each operator $\overline{\alpha}_k$ by an operator $\gamma_k = \exp(i(t_k + \epsilon_k)w)$.

Figure 3:
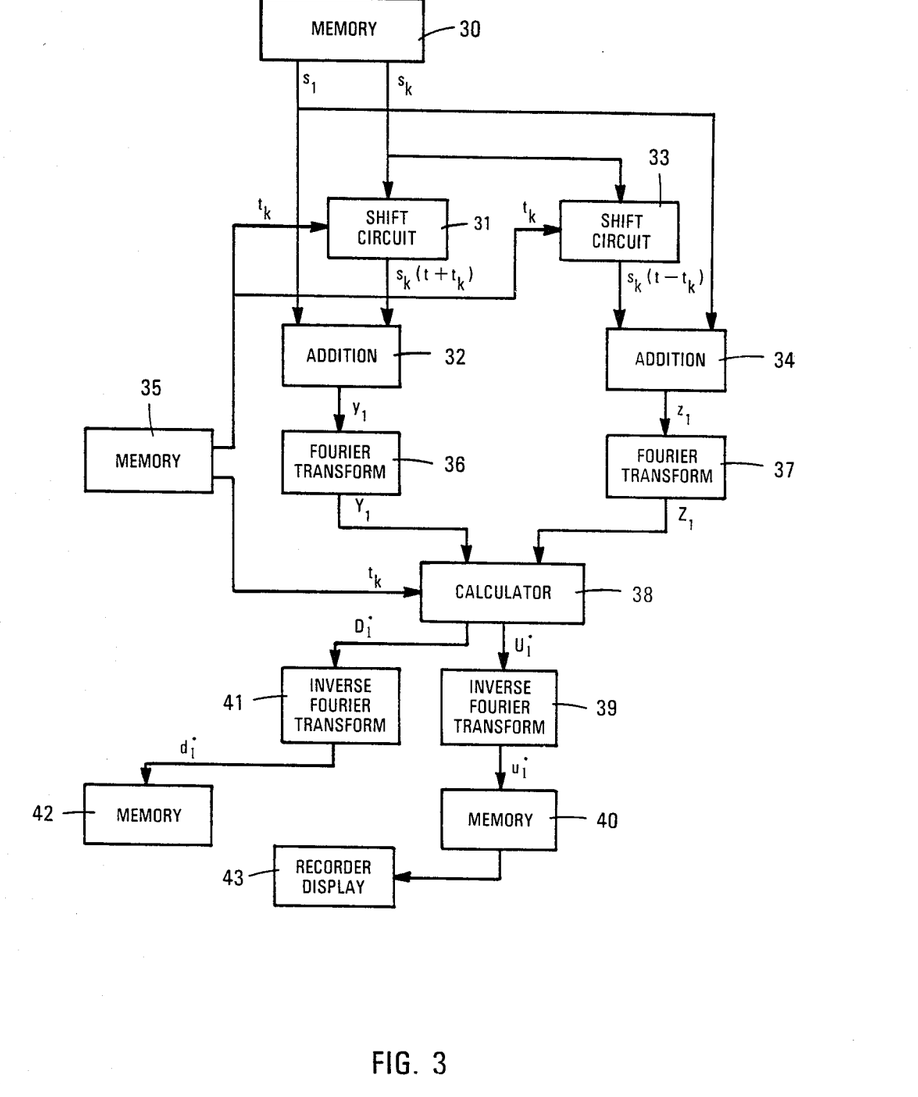
FIG. 3 represents in the form of a block diagram a system according to the invention for the filtering of the detection signals.

The described filtering method is implemented by means of the system of FIG. 3.

The detection signals have been previously recorded and examined so that signals of deficient quality are eliminated.

After this selection there remain N signals $s_1 \ldots s_N$ which are entered in a memory 30.

The memory 30 is controlled to furnish a series of n signals corresponding to successive levels. We shall consider here the processing of the first series of signals $s_1 \ldots s_k \ldots s_n$. The signals $s_2 \ldots s_k \ldots s_n$ are applied to a first shift circuit 31 which delays them respectively by the times $t_2 \ldots t_k \ldots t_n$ in relation to $s_1$. The signal $s_1(t)$ and the signals $s_k(t+t_k)$ obtained are applied to an adder 32 which delivers the sum signal $y_1(t)$. The signals $s_2 \ldots s_n$ are also applied to a second shift circuit 33 which advances them in relation to $s_1$ respectively by the times $t_2 \ldots t_k \ldots t_n$. The signal $s_1(t)$ and the signals $s_k(t-t_k)$ are applied to an adder 34 which furnishes the sum signal $z_1(t)$.

The shift circuits 31 and 33 can be made up, in a manner known to those of the art, of a set of shift registers. The times $t_k$ are determined by measuring the time interval between the first arrivals of the downgoing waves for the signals $s_1$ and $s_k$ and are recorded in a memory 35.

Devices 36 and 37 furnishing the Fourier transforms deliver signals representative of the function $Y_1$ and $Z_1$ from the sums $y_1$ and $z_1$.

A computer 38 is programmed to deliver the parameters $U_1^*$ and $D_1^*$ from the signals $Y_1$ and $Z_1$ and the times $t_k$, in accordance with the relations (6) and (7) above.

A device 39 furnishing the inverse Fourier transform delivers a signal $u_1^*$ from the signal $U_1^*$. The signal $u_1^*$ is entered in a memory 40. A device 41 similarly furnishes the inverse Fourier transform $d_1^*$ which is entered in a memory 42.

This processing is then repeated with the series of signals $s_2 \ldots s_{n+1}$, and so on until the last signal of the series is used, i.e. the signal $s_N$.

The signals $d_1^*$ obtained will be used in a subsequent deconvolution processing.

Figure 6:
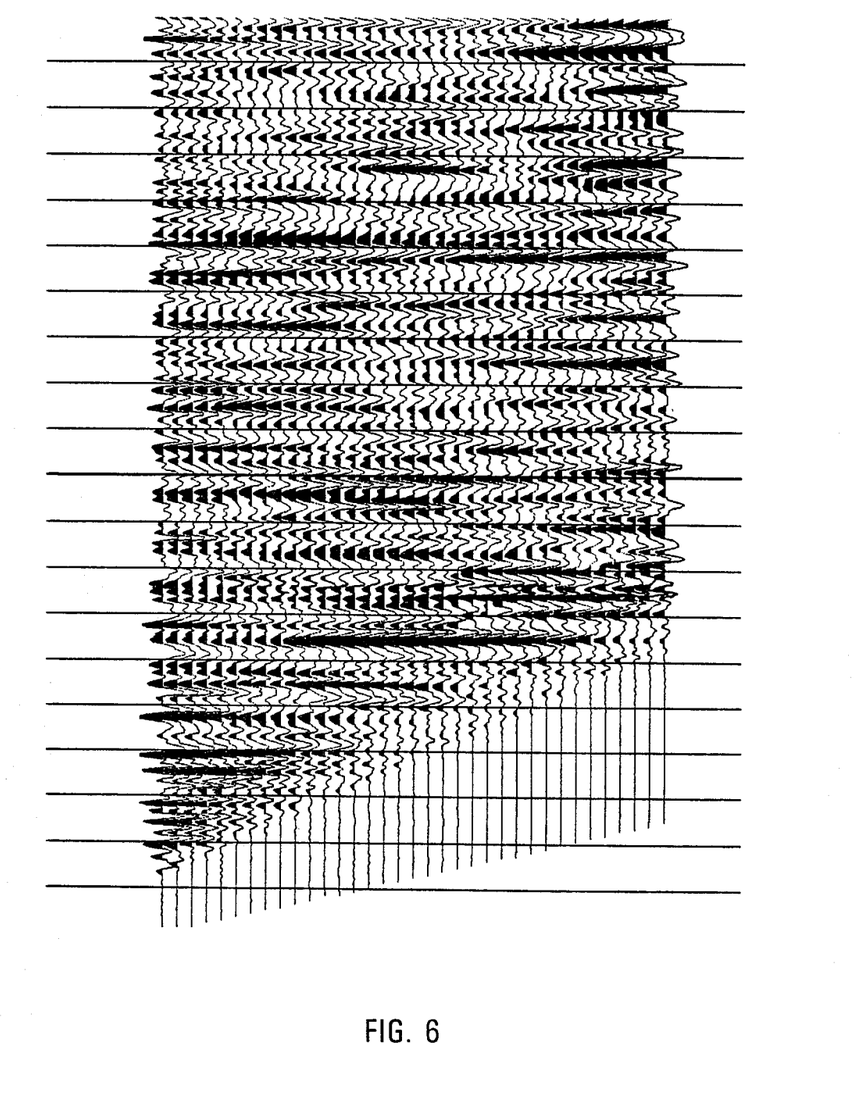

The signals $u_1^*$ obtained are applied to a graphic recorder 43 which produces a vertical seismic profile grouping all the signal diagrams. FIG. 6 shows the seismic profile obtained from the initial traces constituting the seismic profile of FIG. 5, the traces being shifted so that the upgoing waves are vertically aligned.

The diagrams of FIG. 4 illustrate the results obtained using the above described filtering process.

Diagrams 4-1 to 4-11 represent detection signals corresponding to 11 successive levels obtained from synthetic data. All the propagation times between consecutive levels are equal. On all the traces, with the exception of the traces 4-2, 4-5 and 4-8, peaks corresponding to the downgoing waves are observed. The upgoing waves, on the other hand, are practically indistinguishable from the noise.

Before filtering, the traces 4-2, 4-5 and 4-8 whose quality is obviously deficient are eliminated.

By the above filtering method a signal $u^*$ is obtained which exhibits a very marked peak (U) corresponding to the upgoing wave. The downgoing wave component (D) on the other hand is highly attenuated.

This example shows that the filtering method according to the invention does not impose any precise condition on the propagation times and hence the detection levels. In particular, it is not at all necessary for the propagation times between consecutive levels to be equal.

Thus, in FIG. 4, if we consider only the signals actually used, the propagation times between consecutive levels are not all equal, but an altogether satisfactory signal-to-noise ratio is obtained.

The fact that the method according to the invention is not based upon the hypothesis of equal propagation times between consecutive levels is a very important practical advantage.

This makes it possible, first of all, to choose freely the detection levels so as to optimize the acoustic coupling of the detector with the formation.

If the measurement takes place in an open hole, it will be possible to determine the most favorable zones by means of a caliper log indicating the regular diameter zones and an acoustic log indicating the propagation speed of the acoustic waves and hence the compactness of the traversed formations.

If one is working within a cased hole, the decisive factor for coupling will be the quality of the cement bonding to the casing. Th favorable zones can be determined by means of a log such as the one obtained by the apparatus according to U.S. Pat. No. 4,255,798.

Freedom with respect to the choice of detection levels however exists only within a certain range.

Beyond a certain interval between consecutive levels, the correlation between consecutive traces would become less reliable. It is generally assumed that this interval should not exceed about one-third the wavelength of the acoustic waves (see the above-mentioned work of E. I. Gal'perin, page 27). To provide a better idea, a maximum interval of about 40 meters can be indicated.

It is also possible to regard as reasonable a minimum interval of about 10 meters.

As concerns the number n of signals used for determining each signal $u_i^*$, the choice depends on the desired signal-to-noise ratio. For convenience it is preferred to choose an odd number, and a good compromise between the quality of the produced signal and the processing time is obtained with n=7, 9 or 11.

A simplified variant of the filtering method consists in determining the signals $u_i^*$ without going into the frequency domain, the values obtained then being only approximations.

If we consider the expression (1) above $$\sum_{k=1}^{n} s_k(t) - u^*(t+t_k) - d^*(t-t_k)^2$$

and if we cancel its derivative with respect to $d^*(t-t_k)$, we obtain $$\sum_{k=1}^{n} s_k(t+t_k) - d^*(t) - u^*(t+2t_k) = 0 \qquad (8)$$

i.e.

$$z(t) - nd^*(t) - \sum_{k=1}^{n} u^*(t+2t_k) = 0 \qquad (9)$$

In a corresponding manner we obtain, by cancelling the derivative of (1) with respect to $u^*(t)$ $$u^*(t) - \frac{1}{n} y(t) + \frac{1}{n} \sum_{i=1}^{n} d(t-2t_i) = 0 \qquad (10)$$

By expressing the third term of this equation by means of equation (9) and by grouping the expression obtained in the equation (10), we obtain $$u^*(t) = \frac{1}{n} y(t) - \frac{1}{n^2} \sum_{k=1}^{n} z(t - 2t_k) - \quad (11)$$

$$\frac{1}{n^2} \sum_{k=1}^{n} \sum_{i=1}^{n} u^*(t - 2t_i - 2t_k)$$

Neglecting the third term, we arrive at the approximate value $$u^*(t) = \frac{1}{n} y(t) - \frac{1}{n^2} \sum_{k=1}^{n} z(t - 2t_k) \quad (12)$$

The processing necessary for determining the signals $u_i^*$ in this variant is extremely simple because it does not involve any Fourier transformation.

In a similar manner, for the downgoing waves, the approximate value $$d^*(t) = \frac{1}{n} z(t) \frac{1}{n^2} \sum_{k=1}^{n} y(t + 2t_k) \quad (13)$$

is obtained.

Figure 7:
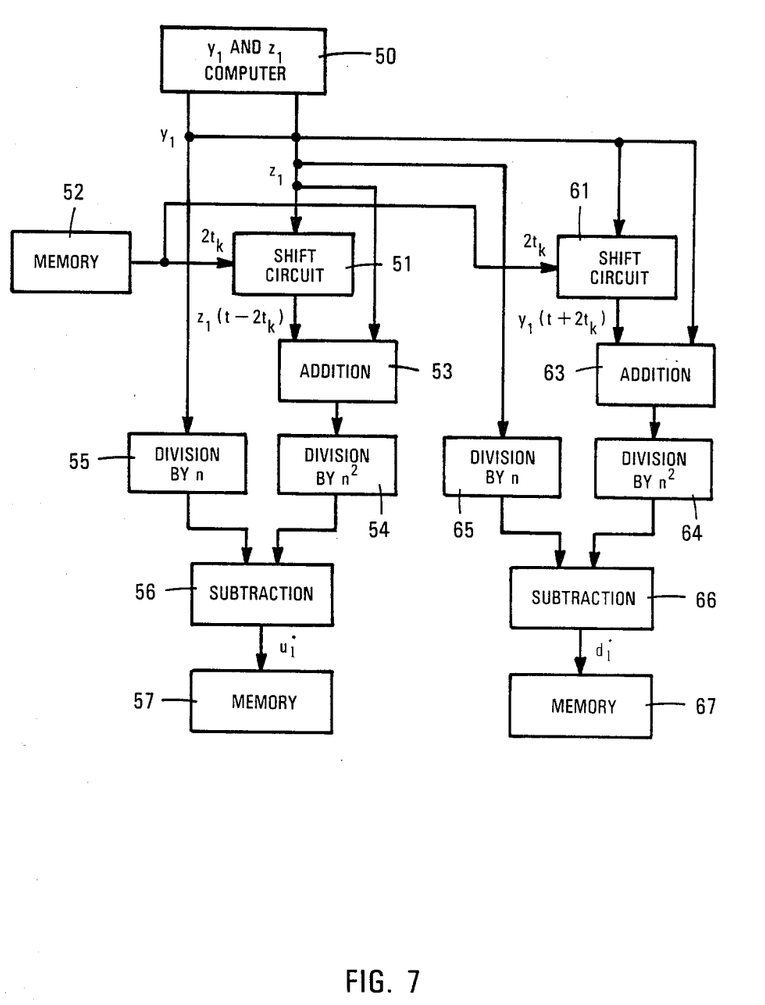
FIG. 7 represents another embodiment of the filtering system.

FIG. 7 represents the apparatus for implementing this variant.

Block 50 in FIG. 7 groups all the elements 30–34 of FIG. 3 and furnishes the signals $y_1(t)$ and $z_1(t)$.

A shift circuit 51 receiving the signal $z_1(t)$ furnishes the shifted signals $z_1(t - 2t_k)$, the times $2t_k$ being furnished by a memory 52. The signals $z_1(t)$ and $z_1(t - 2t_{k2})$ are applied to an adder 53. The sum obtained is divided by $n^2$ in a divider 54.

The signal $y_1(t)$ is divided by n in a divider 55, and the outputs of the dividers 53 and 54 are connected to a subtractor 56 which furnishes the signal $u_1^*(t)$ sought, which is introduced into a memory 57.

The signal $y_1(t)$ is also applied to a shift circuit 61 which furnishes the signals $y_1(t + 2t_k)$ which are applied with the signal $y_1(t)$ to an adder 63 whose output signal is divided by $n^2$ in a divider 64.

The signal $z_1(t)$ is divided by n in a divider 65, and a subtractor 66 receiving the outputs of the dividers 64 and 65 furnishes the signal $d_1^*(t)$ which is entered in a memory 67.

In the above described approach, it has been assumed that the seismic waves from a level $x_1$ to a level $x_k$ were subject to no distortion and only underwent the shift $t_k$ corresponding to the transit time in the section defined between these levels. This is equivalent to neglecting the reflection and transmission effects ascribable to variations in acoustic impedance in this section.

Figure 8:
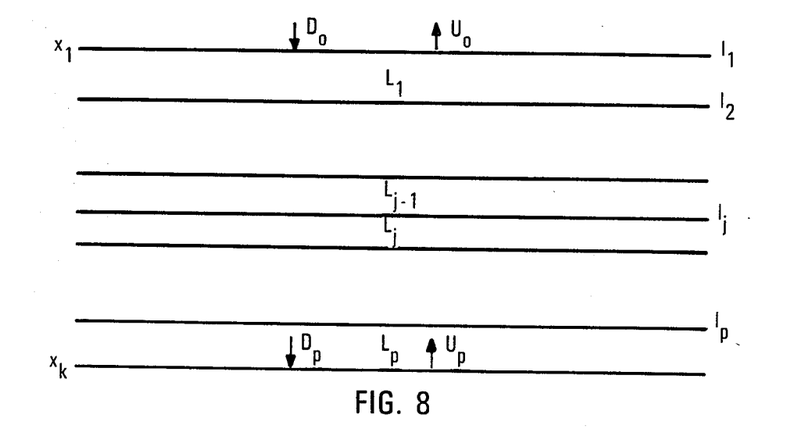
FIG. 8 shows schematically the propagation medium for the waves.

A more complete treatment should take into account the stratified structure of the propagation medium illustrated by FIG. 8. It is assumed that the medium is perfectly elastic and the section between levels $x_1$ and $x_k$ is composed of a series of p layers which are acoustically homogeneous and have identical transit times equal to $t_k/p$. These assumptions imply no loss of generality for the results below.

Each layer $L_j$ has an acoustic impedance $M_j$. At each interface $I_j$ between two layers $L_{j-1}$ and $L_j$ of respective impedances $M_{j-1}$ and $M_j$, an incident wave gives rise to a transmitted wave and a reflected wave. The transmission coefficient $T_j$ and the reflection coefficient $C_j$ related to interface $I_j$ are defined by the following relations.

$$T_j = 1 + C_j \quad (14)$$

$$C_j = \frac{M_j - M_{j-1}}{M_j + M_{j-1}} \quad (15)$$

The coefficients $C_j$ and $T_j$ can therefore be computed from impedances $M_j$, which can be derived from sonic logs obtained in the well.

Knowing all of the coefficients $T_j$ and $C_j$, the upgoing and downgoing wave components $U_p$ and $D_p$ above level $x_k$ can be related to components $U_o$ and $D_o$ above level $x_1$ by equation (8-3-2) of Claerbout in *Fundamentals of Geophysical Data Processing*, McGraw-Hill (1976), expressed n terms of z-transform $$\begin{bmatrix} U_p \\ D_p \end{bmatrix} = \frac{1}{\sqrt{z^p} \prod_{j=1}^{p} T_j} \begin{bmatrix} F_p \, z^p \, \overline{G}_p \\ G_p \, z^p \, \overline{F}_p \end{bmatrix} \begin{bmatrix} U_o \\ D_o \end{bmatrix} \quad (16)$$

in which z is the delay operator equal to exp $(2i\omega t_k/p)$ $F_p$ and $G_p$ are given by the relations $$F_p(z) = F_{p-1}(z) + C_p z G_{p-1}(z) \quad (17)$$

$$G_p(z) = C_p F_{p-1}(z) + z G_{p-1}(z) \quad (18)$$

with $$F_o(z) = 1 \text{ and } G_o(z) = 0$$

and $$\prod_{j=1}^{p} T_j = T_1 \ldots T_j \ldots T_p$$

The physical values which can be directly measured, namely pressure and vertical velocity, are not related to components $U_p$ and $D_p$ directly, but rather to the sum and the difference of these components. From (16) the following relation is derived $$\begin{bmatrix} U_p + D_p \\ U_p - D_p \end{bmatrix} = \frac{1}{\sqrt{z^p}} \begin{bmatrix} A_p \, z^p \, \overline{A}_p \\ B_p \, z^p \, \overline{B}_p \end{bmatrix} \begin{bmatrix} U_o \\ D_o \end{bmatrix} \quad (19)$$

with $$A_p = \frac{F_p + G_p}{\prod_{j=1}^{p} T_j} \text{ and } B_p = \frac{F_p - G_p}{\prod_{j=1}^{p} T_j}$$

The terms $A_p(z)$ and $B_p(z)$ are given by the following relations derived from (17) and (18):

$$A_p = 1/2[(1 + z)A_{p-1} + (1 - z)B_{p-1}] \quad (20)$$

$$B_p = 1/2 \frac{1 - C_p}{1 + C_p} [(1 - z)A_{p-1} + (1 + z)B_{p-1}] \quad (21)$$

with $A_o$ and $B_o = 1$.

With the preceding notations $$S_p(z) = U_p + D_p = \sqrt{z^{-p}} A_p U_o + \sqrt{z^p} \overline{A}_p D_o \quad (22)$$

It is pointed out that should transmission effects be neglected ($A_p=1$), this equation becomes $$S_p(z) = \sqrt{z^{-p}}\, U_o + \sqrt{z^p}\, D_o \qquad (23)$$

and passing into the frequency domain, with the preceding notations, we find again $$S_p(\omega) = \alpha_p U_o + \overline{\alpha}_p D_o \quad \text{where } \alpha_p = \exp(-i\omega t_p)$$
$$\text{and} \quad \overline{\alpha}_p = \exp(i\omega t_p)$$

Hence, taking into account the reflection effects amounts to multiplication of the delay operators $\alpha_p$ and $\overline{\alpha}_p$ by operators $A_p$ and $\overline{A}_p$ respectively.

In the time domain, this is equivalent to correcting the signals $s_k(t+t_k)$ and $s_k(t-t_k)$ by applying convolution operators corresponding to operators $A_p$ and $\overline{A}_p$.

Accordingly, for the derivation of estimations $U_1^*$ and $D_1^*$ which are optimum for a series of signals $s_k$ ($1 \leq k \leq n$), we minimize instead of the expression (2) as above, the expression $$\sum_{k=1}^{n} |S_k - \alpha_k A_k U_1^* - \overline{\alpha}_k \overline{A}_k D_1^*|^2 \qquad (24)$$

The results (relations 25 and 26 below) obtained provide for relations for $U_1^*$ and $D_1^*$ which are similar to relations (6) and (7) above, where $\alpha_k$ and $\overline{\alpha}_k$ are respectively replaced by $\beta_k = \alpha_k A_k$ and $\overline{\beta}_k = \overline{\alpha}_k \overline{A}_k$ and $n$ is replaced by $$P_n = \sum_{k=1}^{n} A_k \overline{A}_k$$

$$U_1^* = \frac{P_n Y_1' - Z_1' \cdot \sum_{k=1}^{n} \beta_k^2}{P_n^2 - \sum_{k=1}^{n} \beta_k^2 \cdot \sum_{k=1}^{n} \overline{\beta}_k^2} \qquad (25)$$

$$D_1^* = \frac{P_n Z_1' - Y_1' \cdot \sum_{k=1}^{n} \overline{\beta}_k^2}{P_n^2 - \sum_{k=1}^{n} \beta_k^2 \cdot \sum_{k=1}^{n} \overline{\beta}_k^2} \qquad (26)$$

in which $$Y_1' = \sum_{k=1}^{n} \alpha_k A_k S_k$$

$$Z_1' = \sum_{k=1}^{n} \overline{\alpha}_k \overline{A}_k S_k$$

$Y_1'$ and $Z_1'$ being the Fourier transforms of sums $y_1'$ and $z_1'$ corresponding to the above-mentioned signals $y_1$ and $z_1$.

The signal $u_1^*(t)$ is obtained as explained above from the inverse Fourier transformation of $U_1^*$ and the operation is repeated to obtain a series of signals $u_i^*(t)$ each of which being obtained from a group of n signals $s_i \ldots s_{i+n-1}$. Subsequently, all of the signals $u_i^*$ are grouped to produce a vertical seismic profile.

Figure 9:
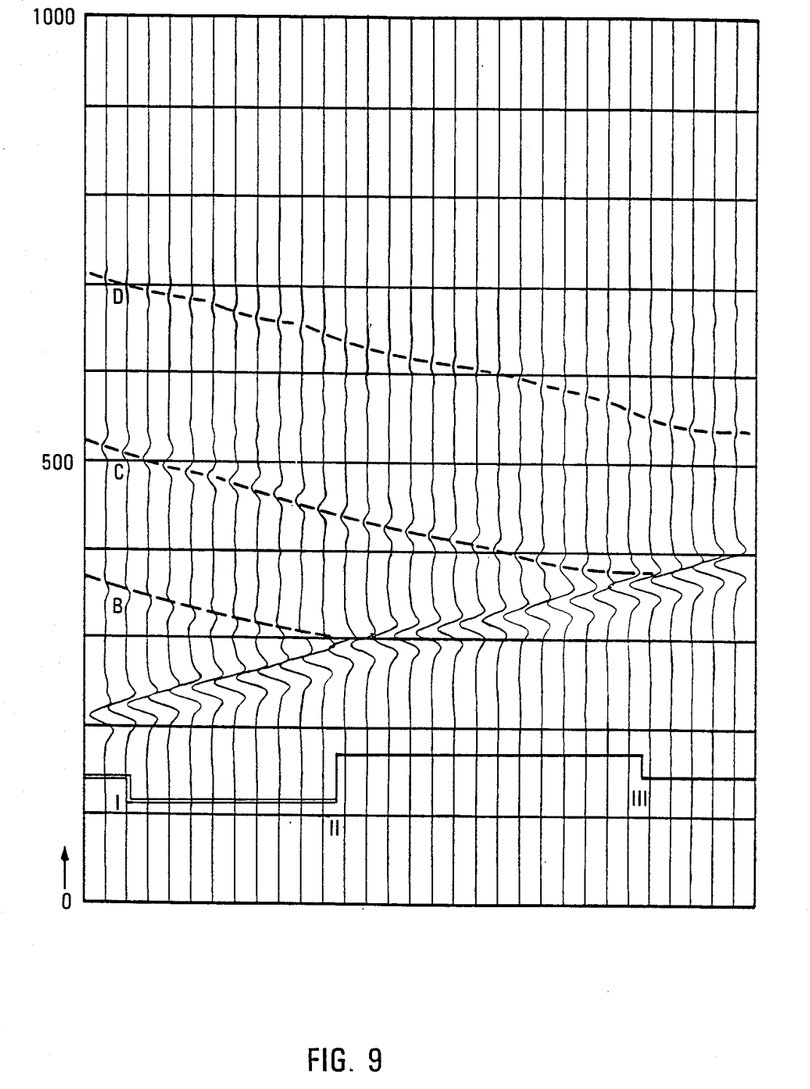
FIG. 9 shows a VSP before filtering.
Figure 10:
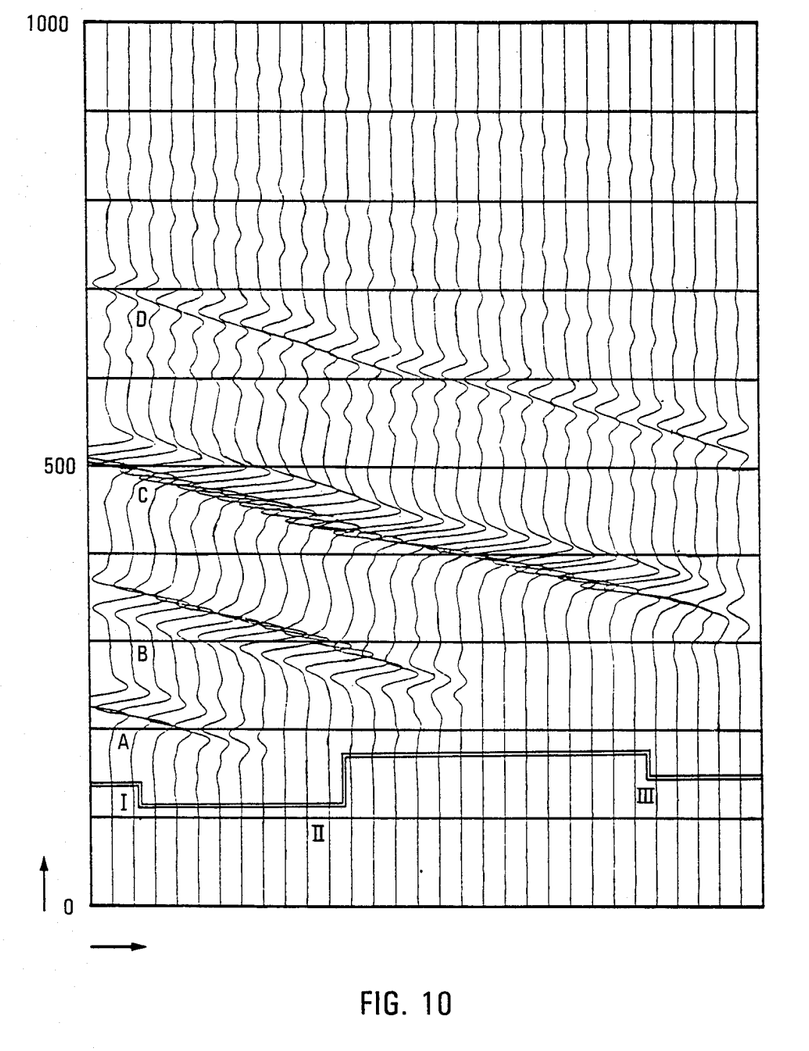
FIG. 10 illustrates the filtering effect provided by the system of FIG. 3 on the VSP of FIG. 9.
Figure 11:
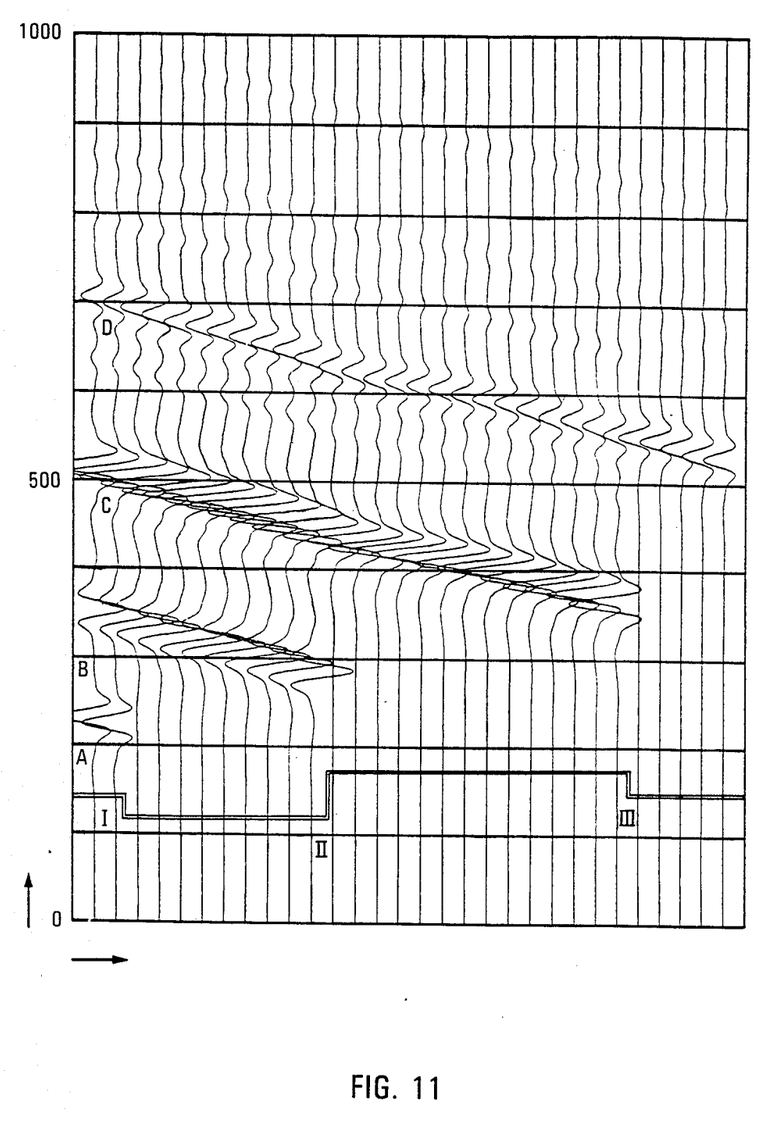
FIG. 11 illustrates the filtering effect obtained when acoustic impedance variations are taken into account.

FIGS. 9 to 11 illustrate the results obtained when interface effects are taken into consideration.

FIG. 9 shows a vertical seismic profile composed of 30 traces and produced from synthetic data, in which the spacing between the successive shot levels is irregular. The full line indicates the variations in acoustic impedance within the section defined between the extreme levels 1 and 30. Three impedance jumps generating reflection effects can be observed. Interface I is located between levels 2 and 3, interface II between levels 11 and 12 and interface III between levels 25 and 26.

In FIG. 9, the downgoing wave corresponding to first arrivals is clearly visible whereas the noticeable upgoing waves have low levels. They are made apparent by curves B, C and D in dashed line.

FIG. 10 illustrates the filtering effect in the case of the approximate approach. The waves B, C and D which can be noticed in FIG. 10 have become clearly defined, and in addition an upgoing wave A is also clearly defined.

The analysis of upgoing waves in relation with the locations of the reflecting interfaces leads to the conclusion that wave A is related to interface I, wave B to interface II, and wave C to interface III. It can be observed, however, that waves A, B and C exhibit anomalous extensions beyond the respective interfaces I, II, III.

FIG. 11 illustrates the filtering effect obtained in accordance with the more accurate approach in which reflection effects are taken into account. A marked difference is to be noted with respect to FIG. 10 in that the above mentioned extensions of waves A, B and C which are deeper than the corresponding interfaces are cancelled. The relations between waves and interfaces thus become more defined. Wave D is not altered and it can be stated to be related to a reflector deeper than level 30.

Figure 12:
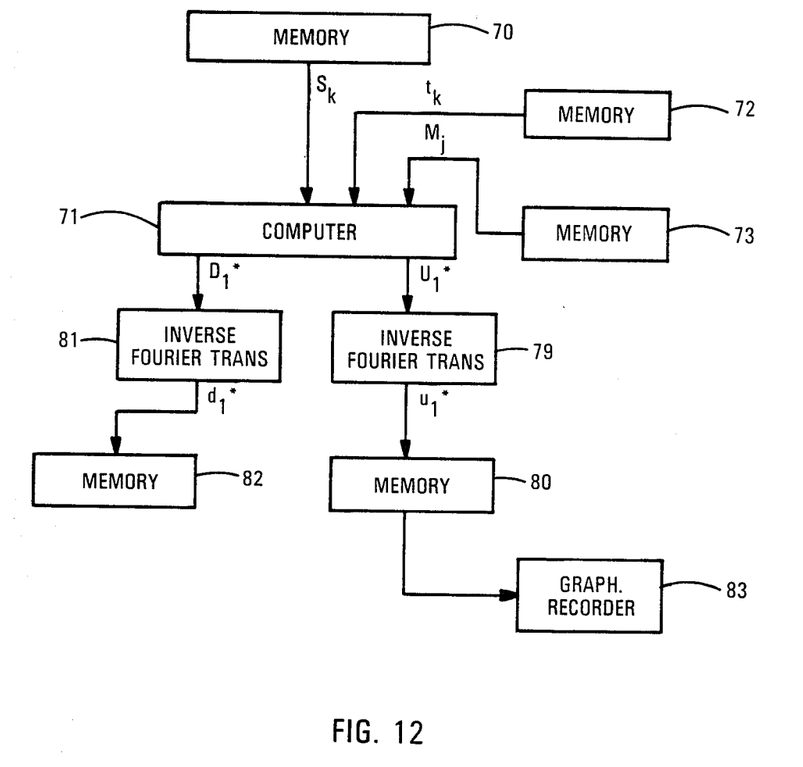
FIG. 12 shows a system for implementing the filtering method in which said variations are taken into account.

FIG. 12 shows a system for implementing the filtering method in which reflection effects are taken into account.

A memory 70 identical with memory 30 of FIG. 3 furnishes signals $s_k$ to a computer 71. The latter receives from a memory 72 the corresponding transit times $t_k$, computed as explained above.

Another memory 73 contains the values of acoustic impedance $M_j$ along the entire section defined between the extreme levels. These values are computed, for each depth, from density and velocity data as measured by logging operations carried out in the well.

The computer 71 fed with $t_k$ and $M_j$ values effects the computations corresponding to equations (15) and (16) and yields the optimum estimations $U_1^*$ and $D_1^*$. The circuits 79 and 81 furnish the inverse Fourier transforms $u_1$ and $d_1$, which are entered and stored in memories 80, 82. The data stored in memory 80 may then be supplied to a graphic recorder 83 for display purposes.

I claim:

1. A seismic exploration method for determining characteristics of a geological formation by obtaining a plurality of signals ($s_k$) derived from a respective plurality of different positions within a borehole that traverses said geological formation and by combining said plurality of signals after having shifted all but one of said signals by a respective acoustic transit time period ($t_k$) in order to enhance the contribution of seismic signals traveling in one direction while reducing the contribution of seismic signals traveling in the opposite direction, characterized by:
   a. determining a plurality of propagation times required for a seismic signal to propagate between a first detector position and a plurality of other detector positions;

b. delaying each of the seismic signals detected at each of said other detector positions by respective propagation times;
c. advancing each of the seismic signals detected at each of said other detector positions by respective propagation times;
d. correcting each of said delayed signals and each of said advanced signals for the effects of the transmissivity of the respective portion of the formation traversed by each of said signals by the application of a transmissivity correction operator;
e. combining said corrected delayed signals with the signal detected at said first detector position to produce a first combined signal ($y_1'$);
f. combining said corrected advanced signals with the signal detected at said first detector position to produce a second combined signal ($Z_1'$); and
g. generating a signal indicative of an optimum estimation of the upgoing wave component by combining said first and second combined signals.

2. The method as recited in claim 1 further including the steps of:
  a. repeating the steps of claim 1 for a plurality of different first detector positions to produce a plurality of optimum estimations of the upgoing wave components; and
  b. recording said plurality of optimum upgoing wave component estimation signals in a display which reveals the location of geological acoustic reflectors.

3. The method as recited in claim 1 wherein said signal indicative of an optimum estimation of the upgoing wave component is determined by taking the inverse Fourier transform of the expression $$U_1^* = \frac{P_n Y_1' - Z_1' \cdot \sum_{k=1}^{n} \beta_k^2}{P_n^2 - \sum_{k=1}^{n} \beta_k^2 \cdot \sum_{k=1}^{n} \overline{\beta}_k^2}$$

where $Y_1'$ is the Fourier transform of $y_1'$ which is the combination of the signal detected at the first detector position with corrected delayed signals from the other positions; $Z_1'$ is the Fourier transform of $z_1'$ which is the combination of the signal detected at the first detector position with corrected advanced signals from the other positions; $P_n$ is equal to $$\sum_{k=1}^{n} A_k \overline{A}_k$$

where $A_k$ is the Fourier transform of the transmissivity correction operator and $\overline{A}_k$ its conjugate; $\alpha_k$ and $\overline{\alpha}_k$ are respectively the operators $\exp(-it_k\omega)$ and $\exp(it_k\omega)$; and $\beta_k$ and $\overline{\beta}_k$ are respectively $\alpha_k A_k$ and $\overline{\alpha}_k \overline{A}_k$.

4. The method as recited in claim 1 further including the step of generating a signal indicative of an optimum estimation of the downgoing wave component by combining said first and second combined signals.

5. The method as recited in claim 4 wherein said optimum estimation of the downgoing wave component is determined according to the expression $$D_1^* = \frac{P_n Z_1' - Y_1' \cdot \sum_{k=1}^{n} \overline{\beta}_k^2}{P_n^2 - \sum_{k=1}^{n} \beta_k^2 \cdot \sum_{k=1}^{n} \overline{\beta}_k^2}$$

where $Y_1'$ is the Fourier transform of $y_1'$ which is the combination of the signal detected at the first detector position with corrected delayed signals from the other positions; $Z_1'$ is the Fourier transform of $z_1'$ which is the combination of the signal detected at the first detector position with corrected advanced signals from the other positions; $P_n$ is equal to $$\sum_{k=1}^{n} A_k \overline{A}_k$$

where $A_k$ is the Fourier transform of the transmissivity correction operator and $\overline{A}_k$ its conjugate; $\alpha_k$ and $\alpha_k$ are respectively the operators $\exp(-it_k w)$ and $\exp(it_k w)$; and $\beta_k$ and $\beta_k$ are respectively $\alpha_k A_k$ and $\alpha_k \overline{A}_k$.

6. The method as recited in claim 5 further including the steps of:
  a. repeating the steps of claim 1 for a plurality of different first detector positions and producing an optimum estimation of the downgoing wave components for each of said plurality of different first detector positions; and
  b. recording said plurality of optimum downgoing wave component estimation signals in a display which reveals the location of geological acoustic reflectors.

* * * * *